(12) United States Patent
Feng et al.

(10) Patent No.: US 10,388,422 B2
(45) Date of Patent: Aug. 20, 2019

(54) ELECTRICALLY CONDUCTIVE ELEMENT

(71) Applicant: Beijing FUNATE Innovation Technology Co., LTD., Beijing (CN)

(72) Inventors: Chen Feng, Beijing (CN); Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 759 days.

(21) Appl. No.: 13/786,600

(22) Filed: Mar. 6, 2013

(65) Prior Publication Data
US 2013/0287998 A1 Oct. 31, 2013

(30) Foreign Application Priority Data

Apr. 25, 2012 (CN) .......................... 2012 1 0122616

(51) Int. Cl.
*H01B 1/18* (2006.01)
*H01B 1/24* (2006.01)
*B82Y 30/00* (2011.01)

(52) U.S. Cl.
CPC ................ *H01B 1/18* (2013.01); *H01B 1/24* (2013.01); *B82Y 30/00* (2013.01); *Y10T 428/24331* (2015.01); *Y10T 428/249924* (2015.04)

(58) Field of Classification Search
CPC ........ B32B 2307/202; B32B 2457/208; B32B 2307/412; B32B 2313/04; B32B 2309/105; B32B 2457/206; B32B 2262/106; B32B 9/007; B82Y 15/00; B82Y 30/00; B82Y 40/00; H01B 1/04; H01B 1/18; H01B 1/20; H01B 1/22; H01B 1/24; H01B 13/0026;
(Continued)

(56) References Cited

U.S. PATENT DOCUMENTS 7,754,332 B2 * 7/2010 Potier ..................... B32B 18/00
428/212
8,237,669 B2 * 8/2012 Jiang et al. ................... 345/173
(Continued)

FOREIGN PATENT DOCUMENTS

CN 101458975 6/2009
CN 101790490 7/2010
(Continued)

OTHER PUBLICATIONS

Sandler et al, "Ultra-low electrical percolation threshold in carbon-nanotube-epoxy composites," Jul. 16, 2003, Polymer, Elsevier, vol. 44, Issue 19, pp. 5893-5899.*

*Primary Examiner* — Maria V Ewald
*Assistant Examiner* — Ethan Weydemeyer
(74) *Attorney, Agent, or Firm* — ScienBiziP, P.C.

(57) ABSTRACT

An electrically conductive element includes a substrate and a carbon nanotube film located on the substrate. The carbon nanotube film includes a number of carbon nanotube linear units and a number of carbon nanotube groups. The carbon nanotube linear units are spaced from each other and extend along a first direction. The carbon nanotube groups are combined with the carbon nanotube linear units by van der Waals force on a second direction. The second direction is intercrossed with the first direction. The carbon nanotube groups between adjacent carbon nanotube linear units are spaced from each other in the first direction.

20 Claims, 15 Drawing Sheets

(58) Field of Classification Search
CPC . H01B 13/0036; H01L 31/18; H01L 51/0048;
H01L 51/444; H01L 51/5203; H01L
2251/5369; H01L 29/0673; H01L
29/0676; H01L 33/42; Y10T 428/24331;
Y10T 428/249924; Y10S 977/742; Y10S
977/932; Y10S 977/842; Y10S 977/953
USPC .............................. 428/408, 292.1; 977/832
See application file for complete search history.

(56)  References Cited

U.S. PATENT DOCUMENTS

| | | | | |
|---|---|---|---|---|
| 8,243,029 B2* | 8/2012 | Jiang et al. | ................ | 345/173 |
| 8,815,397 B2* | 8/2014 | Jiang et al. | ................ | 428/408 |
| 2003/0122111 A1* | 7/2003 | Glatkowski | ............ | B82Y 10/00 |
| | | | | 252/500 |
| 2004/0047038 A1* | 3/2004 | Jiang | ................ | B82Y 20/00 |
| | | | | 359/485.01 |
| 2004/0250950 A1* | 12/2004 | Dubrow | ................ | C09J 5/00 |
| | | | | 156/276 |
| 2007/0298253 A1* | 12/2007 | Hata et al. | ................ | 428/339 |
| 2008/0170982 A1* | 7/2008 | Zhang | ................ | B82Y 10/00 |
| | | | | 423/447.3 |
| 2009/0042455 A1* | 2/2009 | Mann et al. | ................ | 439/874 |
| 2009/0153502 A1* | 6/2009 | Jiang et al. | ................ | 345/173 |
| 2009/0167708 A1 | 7/2009 | Jiang et al. | | |
| 2009/0167710 A1 | 7/2009 | Jiang et al. | | |
| 2009/0267000 A1* | 10/2009 | Chen et al. | ............ | 250/492.1 |
| 2009/0311489 A1 | 12/2009 | Sheehan et al. | | |
| 2010/0000803 A1* | 1/2010 | Yang | ................ | G06F 3/044 |
| | | | | 178/18.06 |
| 2010/0007625 A1* | 1/2010 | Jiang | ................ | G06F 3/0414 |
| | | | | 345/173 |
| 2010/0124645 A1* | 5/2010 | Jiang et al. | ................ | 428/220 |
| 2010/0124646 A1 | 5/2010 | Jiang et al. | | |
| 2010/0215985 A1* | 8/2010 | Kitano | ................ | 428/688 |
| 2010/0327444 A1* | 12/2010 | Kondo | ................ | B82Y 30/00 |
| | | | | 257/746 |
| 2011/0036828 A1 | 2/2011 | Feng et al. | | |
| 2011/0095237 A1 | 4/2011 | Liu et al. | | |
| 2011/0135894 A1 | 6/2011 | Liu et al. | | |
| 2011/0171419 A1 | 7/2011 | Li et al. | | |
| 2011/0253907 A1 | 10/2011 | Qian et al. | | |
| 2013/0306490 A1* | 11/2013 | Laubscher | ................ | D01F 9/12 |
| | | | | 205/766 |

FOREIGN PATENT DOCUMENTS

| | | | | |
|---|---|---|---|---|
| CN | 101850961 | | 10/2010 | |
| CN | 101894720 A | * | 11/2010 | ............. H01J 37/20 |
| CN | 102086035 | | 6/2011 | |
| TW | 200928912 | | 7/2009 | |
| TW | 201020208 | | 6/2010 | |
| TW | 201020209 | | 6/2010 | |
| TW | 201107548 | | 3/2011 | |
| TW | 201121877 | | 7/2011 | |
| TW | 201137919 | | 11/2011 | |

* cited by examiner

ELECTRICALLY CONDUCTIVE ELEMENT

RELATED APPLICATIONS

This application claims all benefits accruing under 35 U.S.C. § 119 from China Patent Application No. 201210122616.7, filed on Apr. 25, 2012 in the China Intellectual Property Office, the disclosure of which is incorporated herein by reference.

BACKGROUND

1. Technical Field

The present disclosure relates to electrically conductive elements, and particularly, to an electrically conductive element based on carbon nanotubes.

2. Discussion of Related Art

Electrically conductive elements, especially transparent conductive elements, are important elements in various electronic devices, such as touch panels, liquid crystal display devices, or field emission display devices.

Conventional conductive elements usually include a substrate and a transparent metal oxide film formed on the substrate. The transparent metal oxide film can be an indium-tin oxide film or a zinc oxide. However, after being continuously folded, the resistance of the metal oxide films at the folded location increases, and the mechanical and chemical properties are not ideal. The metal oxide films are mainly made by vacuum evaporation methods and magnetron sputtering methods. The drawbacks of these methods include complicated equipment, high cost and being unsuitable for mass production. Furthermore, these methods need a process of high-temperature annealing, which will damage the substrate on which the transparent conductive film is formed, whereby the substrate with a low melting point cannot be used for forming the film. Thus, the conventional methods have their limitations. In addition, the metal oxide films are usually electrically isotropic conductive film, which makes the conductive elements electrically isotropic conductive.

What is needed, therefore, is to provide an electrically conductive element with electrically anisotropic conductivity, to overcome the above shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
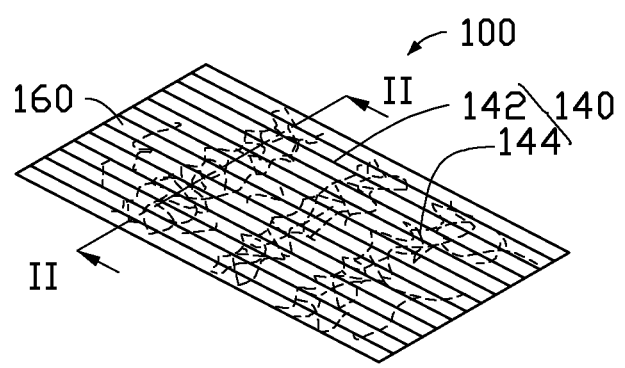
FIG. 1 is a schematic view of one embodiment of a conductive element including a carbon nanotube film.
Figure 2:
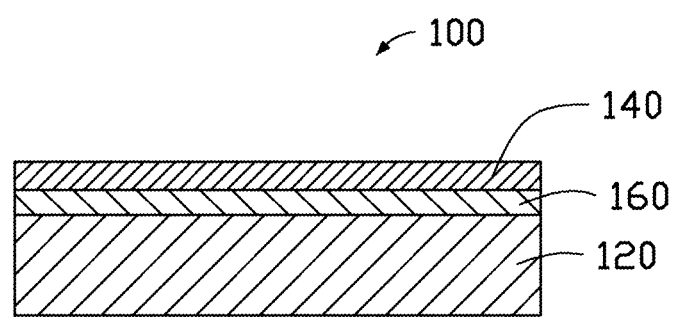
FIG. 2 is a sectional view of the conductive element shown in FIG. 1 along a broken line II-II.

Referring to FIG. 1 and FIG. 2, one embodiment of an electrically conductive element 100 includes a substrate 120 and a carbon nanotube layer 140 located on the substrate 120.

The substrate 120 supports the carbon nanotube layer 140. The substrate 120 can be a curved structure or a sheet-shaped structure. The substrate 120 can be transparent. The substrate 120 can be made of a hard material or a flexible material. The material of the substrate 120 can be glass, quartz, diamond, or plastics. More specifically, the flexible material of the substrate 120 can be a polycarbonate (PC), polyethylene (PE), polypropylene (PP), polymethyl methacrylate (PMMA), polyethylene terephthalate (PET), polyether sulfone (PES), polyimide (PI), polyvinyl chloride (PVC), benzocyclobutene (BCB), cellulose ester, polyester, acrylic resin or any combination thereof. In one embodiment, the substrate 120 is a PET film with relatively good transparency.

Figure 3:
FIG. 3 is an optical microscope image of the carbon nanotube film shown in FIG. 1.
Figure 4:
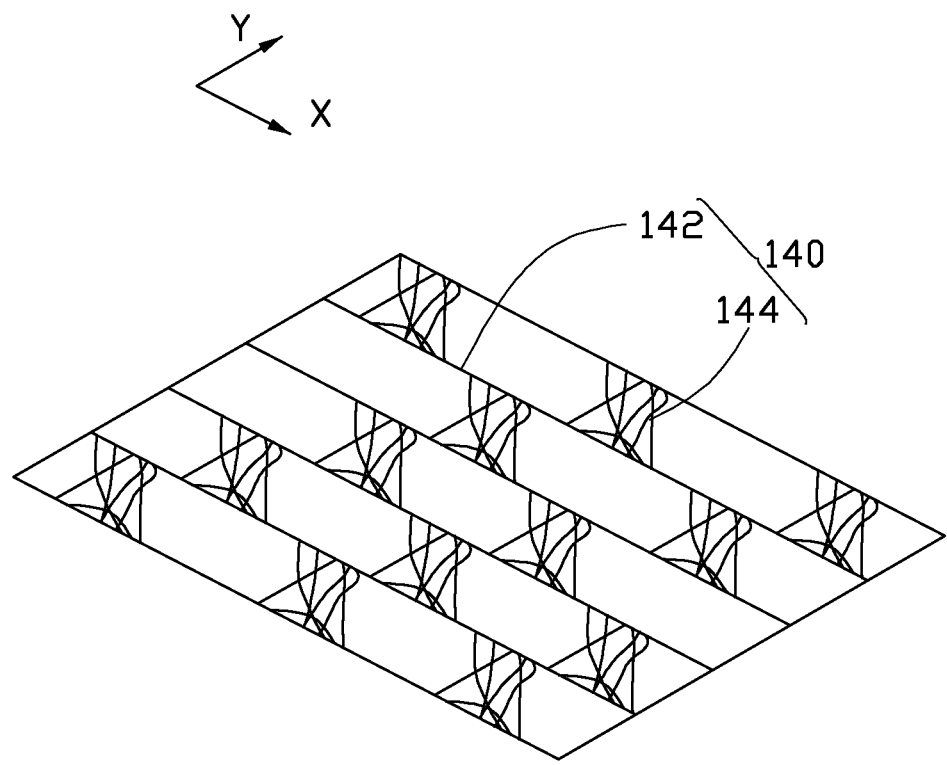
FIG. 4 is a schematic view of one embodiment of a carbon nanotube film including a number of carbon nanotube groups interlacedly arranged.

The carbon nanotube layer 140 can include at least one carbon nanotube film. In one embodiment, the carbon nanotube layer 140 is a single layer of carbon nanotube film shown in FIG. 3. The carbon nanotube film includes a number of carbon nanotube linear units 142 and a number of carbon nanotube groups 144. The carbon nanotube linear units 142 are arranged apart from each other. The carbon nanotube groups 144 join with the carbon nanotube linear units 142 by van der Waals force. The carbon nanotube groups 144 located between adjacent carbon nanotube linear units 142 are apart from each other.

Each carbon nanotube linear unit 142 includes a number of first carbon nanotubes extending substantially along a first direction X. Adjacent first carbon nanotubes extending substantially along the first direction X are joined end to end by van der Waals attractive force. In one embodiment, an axis of each carbon nanotube linear unit 142 is substantially parallel to the axes of first carbon nanotubes in each carbon nanotube linear unit 142. The carbon nanotube linear units 142 extend substantially along the first direction X, and are separated from each other in a second direction Y intercrossed with the first direction X. A shape of the intersection between each carbon nanotube linear unit 142 can be a semi-circle, circle, ellipse, oblate spheroid, or other shapes. In one embodiment, the carbon nanotube linear units 142 are substantially parallel to each other. Distances between adjacent carbon nanotube linear units 142 are substantially equal. The carbon nanotube linear units 142 are substantially coplanar. An effective diameter of each carbon nanotube linear unit 142 is larger than or equal to 0.1 micrometers, and less than or equal to 100 micrometers. In one embodiment, the effective diameter of each carbon nanotube linear unit 142 is larger than or equal to 5 micrometers, and less than or equal to 50 micrometers. Distances between adjacent carbon nanotube linear units 142 are not limited and can be selected as desired. In one embodiment, the distance between adjacent carbon nanotube linear units 142 is greater than 0.1 millimeters. Diameters of the carbon nanotube linear units 142 can be selected as desired. In one embodiment, the diameters of the carbon nanotube linear units 142 are substantially equal.

The carbon nanotube groups 144 are separated from each other and combined with adjacent carbon nanotube linear units 142 by van der Waals force in the second direction Y, so that the carbon nanotube film 140 is a free-standing structure. "Free-standing structure" means that the carbon nanotube film does not have to be supported by a substrate and can sustain the weight of itself when it is hoisted by a portion thereof without tearing. The carbon nanotube groups 144 are alternated with the carbon nanotube linear units 142 on the second direction Y. In one embodiment, the carbon nanotube groups 144 arranged in the second direction Y are separated from each other by the carbon nanotube linear units 142. The carbon nanotube groups 144 arranged in the second direction Y can connect with the carbon nanotube linear units 142.

The carbon nanotube group 144 includes a number of second carbon nanotubes joined by van der Waals force. Axes of the second carbon nanotubes can be substantially parallel to the first direction X or the carbon nanotube linear units 142. The axes of the second carbon nanotubes can also be intercrossed with the first direction X or the carbon nanotube linear units 142 such that the second carbon nanotubes in each carbon nanotube group 144 are intercrossed into a network structure.

In one embodiment, the carbon nanotube groups 144 can be interlacedly located in the second direction Y and disorderly arranged in the second direction Y. As such, the carbon nanotube groups 144 in the second direction Y form non-linear conductive paths. In one embodiment, the carbon nanotube groups 144 are arranged into columns in the second direction Y, thus the carbon nanotube groups 144 form consecutive and linear conductive paths in the second direction. In one embodiment, the carbon nanotube groups 144 in the carbon nanotube film are arranged in an array. A length of each carbon nanotube group 144 in the second direction Y is substantially equal to the distance between adjacent carbon nanotube linear units 142. The length of each carbon nanotube group 144 in the second direction Y is greater than 0.1 millimeters. The carbon nanotube groups 144 are also spaced from each other along the first direction X. Spaces between adjacent carbon nanotube groups 144 in the first direction X are greater than or equal to 1 millimeter.

The carbon nanotube film includes a number of carbon nanotubes. The carbon nanotubes can be formed into carbon nanotube linear units 142 and carbon nanotube groups 144.

In one embodiment, the carbon nanotube film consists of the carbon nanotubes. The carbon nanotube film defines a number of apertures. Specifically, the apertures are mainly defined by the separate carbon nanotube linear units 142 and the spaced carbon nanotube groups 144. The arrangement of the apertures is similar to the arrangement of the carbon nanotube groups 144. In the carbon nanotube film, if the carbon nanotube linear units 142 and the carbon nanotube groups 144 are orderly arranged, the apertures are also orderly arranged. In one embodiment, the carbon nanotube linear units 142 and the carbon nanotube groups 144 are substantially arranged in an array, the apertures are also arranged in an array. A ratio between a sum area of the carbon nanotube linear units 142 and the carbon nanotube groups 144 and an area of the apertures is less than or equal to 1:19. In other words, in the carbon nanotube film, a ratio of the area of the carbon nanotubes to the area of the apertures is less than or equal to 1:19. In one embodiment, in the carbon nanotube film, the ratio of the sum area of the carbon nanotube linear units 142 and the carbon nanotube groups 144 to the area of the apertures is less than or equal to 1:49. Therefore, a transparence of the carbon nanotube film is greater than or equal to 95%. In one embodiment, the transparence of the carbon nanotube film is greater than or equal to 98%.

The carbon nanotube film is an anisotropic conductive film. The carbon nanotube linear units form first conductive paths along the first direction, as the carbon nanotube linear units 142 extend substantially along the first direction X. The carbon nanotube groups 144 form second conductive paths along the second direction Y. Therefore, a resistance of the carbon nanotube film in the first direction X is different from a resistance of the carbon nanotube film in the second direction Y. The resistance of the carbon nanotube film in the second direction Y is 10 times greater than the resistance of the carbon nanotube film in the first direction X. In one embodiment, the resistance of the carbon nanotube film in the second direction Y is 20 times greater than the resistance of the carbon nanotube film in the first direction X. In one embodiment, the resistance of the carbon nanotube film in the second direction Y is about 50 times greater than the resistance of the carbon nanotube film in the first direction X. In the carbon nanotube film, the carbon nanotube linear units 142 are joined by the carbon nanotube groups 144 in the second direction Y, which makes the carbon nanotube film strong and stable.

There can be a few carbon nanotubes surrounding the carbon nanotube linear units and the carbon nanotube groups in the carbon nanotube film. However, these few carbon nanotubes have a small and negligible effect on the carbon nanotube film properties.

The carbon nanotube layer 140 can include a number of carbon nanotube films overlapped with each other, and the carbon nanotube linear units extend substantially along the first direction X. The carbon nanotube films also can be located side by side and contacting each other.

The carbon nanotube layer 140 can be adhered to the surface of the substrate 120 by van der Waals force. The carbon nanotube layer 140 defines a number of apertures, and the surface of the substrate 120 can be exposed through the apertures into the surrounding. In one embodiment, the conductive element 100 further includes an adhesive layer 160, and the carbon nanotube layer 140 is fixed on the substrate 120 by the adhesive layer 160. Some of the adhesive layer 160 is exposed from the carbon nanotube layer 140 through the apertures. The adhesive layer 160 can be made from thermoplastic adhesive, thermoset resin, or UV adhesive. A thickness of the adhesive layer 160 can be from about 1 nanometer to about 500 micrometers. In one embodiment, the thickness of the adhesive layer 160 is from about 1 micrometer to about 2 micrometers. The adhesive layer 160 can be transparent, and the transparency is greater than or equal to 75%. In one embodiment, the adhesive layer 160 is the UV adhesive layer with the thickness of about 1.5 micrometers.

A method for making the conductive element includes the following steps. Firstly, the carbon nanotube layer and the substrate are provided. Secondly, the carbon nanotube layer is fixed on the substrate. The carbon nanotube layer can be adhered to the substrate through the adhesive layer. The carbon nanotube layer is strong and flexible. If the substrate is also flexible, the conductive element can also be a flexible structure. Therefore, the conductive element can be made by a roll-to-roll process.

One embodiment of a method for making the carbon nanotube film includes steps of:

providing an original carbon nanotube film, a substrate, and a pair of rollers capable of providing a pressure, the original carbon nanotube film including a number of carbon nanotubes joined end to end by van der Waals attractive force and extending substantially along a first direction;

passing the original carbon nanotube film and the substrate between the pair of rollers such that the original carbon nanotube is fixed on the substrate under pressure, wherein the original carbon nanotube film is suspended before passing the pair of rollers;

forming a patterned carbon nanotube film by patterning the original carbon nanotube film to define at least one row of through holes arranged in the original carbon nanotube film in the first direction, each row of the through holes including at least two spaced though holes;

treating the patterned carbon nanotube film with a solvent such that the patterned carbon nanotube film is shrunk into a carbon nanotube film; and laying the carbon nanotube film on the substrate and then passing the substrate with the carbon nanotube film thereon between the pair of rollers such that the carbon nanotube is fixed on the substrate under the pressure, thereby forming the conductive element.

The pair of rollers are arranged cooperatively to apply a pressure on the object passing therebetween. The rollers have two substantially parallel shafts, upon which the rollers can rotate clockwise or counterclockwise. The method for making the conductive element can further include a step of providing a pulling unit capable of collecting the conductive element. The pulling unit also can be capable of bringing the conductive element for the next working procedure.

Figure 5:
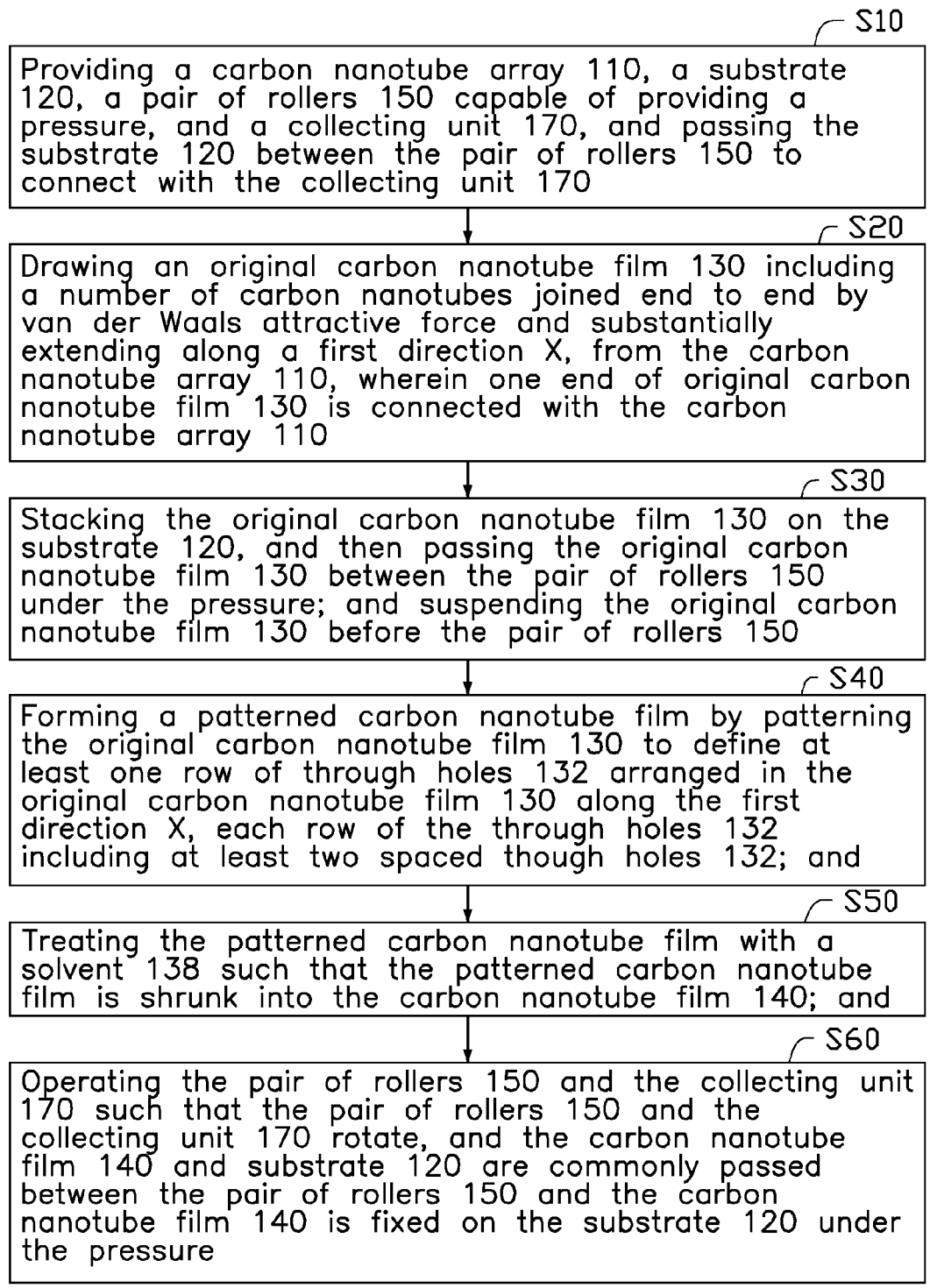
FIG. 5 is a flowchart of one embodiment of a method for making a conductive element.
Figure 6:
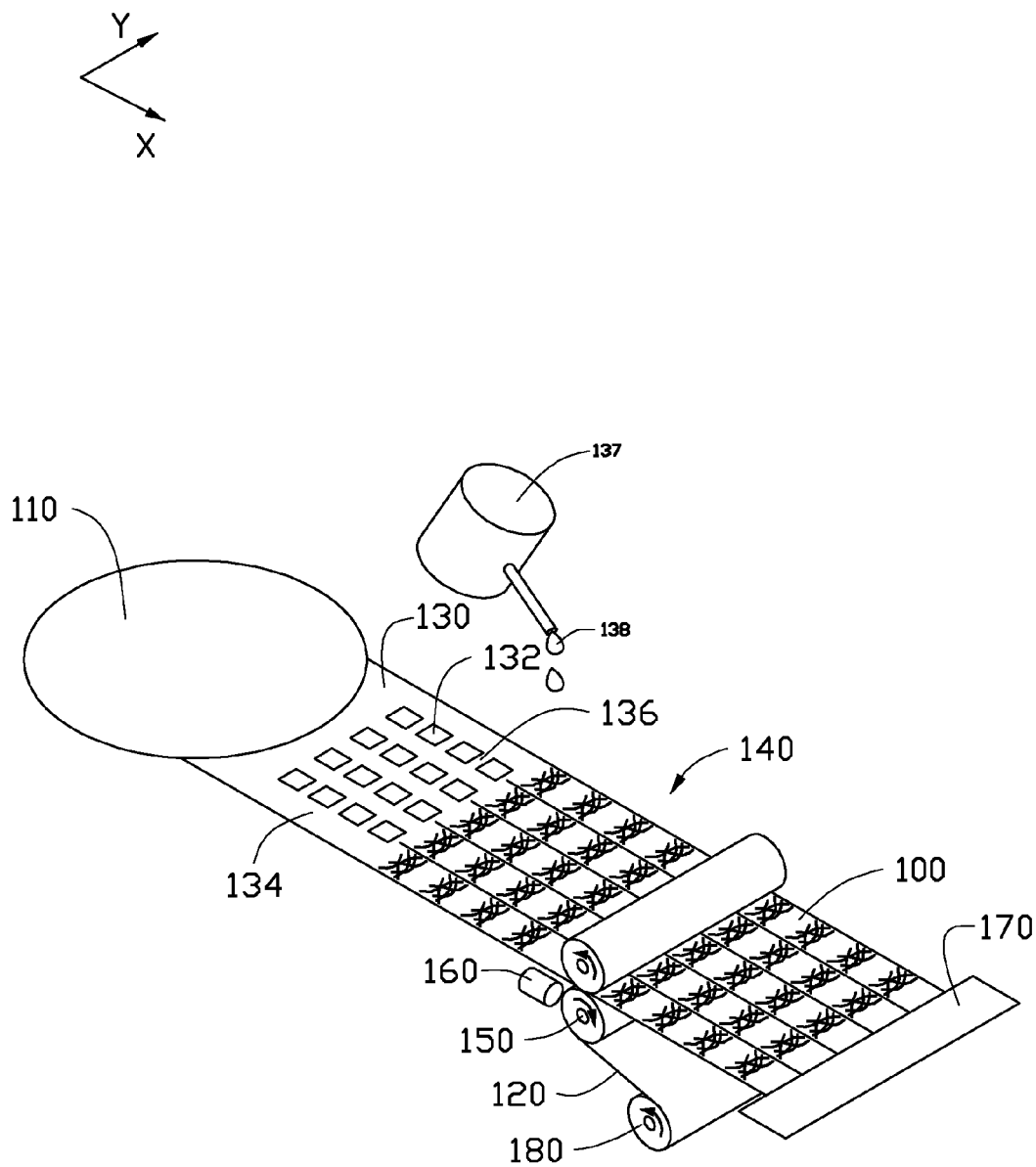
FIG. 6 illustrates one embodiment of a method for making a conductive element.
Figure 7:
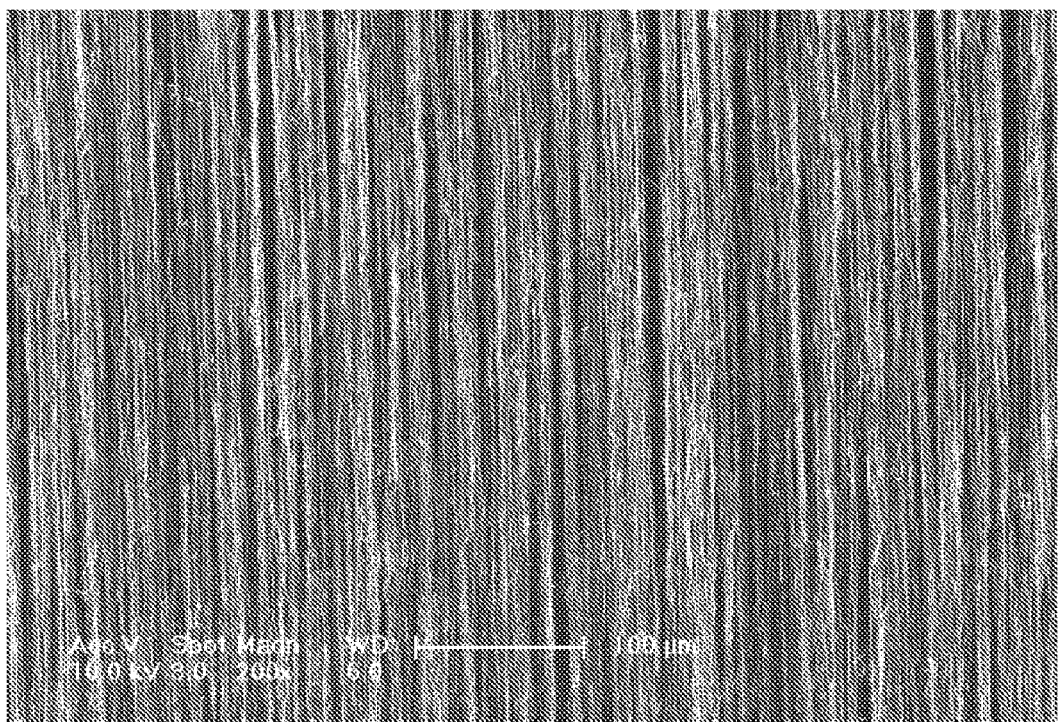
FIG. 7 is a scanning electron microscope (SEM) image of an original carbon nanotube film used in FIG. 6.

More specifically, referring to FIG. 5 and FIG. 6, one embodiment of the method for making the conductive element 100, includes steps of:

S10, providing a carbon nanotube array 110, a substrate 120, a pair of rollers 150 capable of providing a pressure, and a collecting unit 170, and passing the substrate 120 between the pair of rollers 150 to connect with the collecting unit 170;

S20, drawing an original carbon nanotube film 130 including a number of carbon nanotubes joined end to end by van der Waals attractive force and extending substantially along a first direction X from the carbon nanotube array 110, wherein one end of original carbon nanotube film 130 is connected with the carbon nanotube array 110;

S30, stacking the original carbon nanotube film 130 on the substrate 120, passing the original carbon nanotube film 130 between the pair of rollers 150 under the pressure, and suspending the original carbon nanotube film 130 before the pair of rollers 150;

S40, forming a patterned carbon nanotube film by patterning the original carbon nanotube film 130 to define at least one row of through holes 132 arranged in the original carbon nanotube film 130 along the first direction X, each row of the through holes 132 including at least two spaced though holes 132; and S50, treating the patterned carbon nanotube film with a solvent 138 such that the patterned carbon nanotube film is shrunken into the carbon nanotube film 140; and S60, operating the pair of rollers 150 and the collecting unit 170 such that the pair of rollers 150 and the collecting unit 170 rotate, the carbon nanotube film 140 and substrate 120 are commonly passed between the pair of rollers 150, and the carbon nanotube film 140 is fixed on the substrate 120 under the pressure.

In step S10, the carbon nanotube array 110 can be formed by a chemical vapor deposition method. The carbon nanotube array 110 is formed on a growing substrate, and includes a number of carbon nanotubes substantially perpendicular to a surface of the growing substrate. The carbon nanotube array 110 is essentially free of impurities such as carbonaceous or residual catalyst particles. The carbon nanotubes in the carbon nanotube array 110 are closely packed together by van der Waals attractive force. The carbon nanotubes can be single-walled carbon nanotubes, double-walled carbon nanotubes, or multi-walled carbon nanotubes. In one embodiment, the length of the carbon nanotubes can range approximately from 100 microns to 900 microns.

In step S10, the substrate 120 is a flexible and sheet-shaped material. Each of the rollers 150 can have a resilient surface. A rubber material can be coated on the resilient surface of each roller 150. In other embodiments, the rollers 150 can have a rigid metal surface coating, and can be heated to an elevated temperature. The rollers 150 can then hot press the substrate 120 and the carbon nanotube film 140 passed therebetween. The rollers 150 can both be longer than each of the widths of the substrate 120 and the carbon nanotube film 140. In one embodiment, the substrate 120 is provided by being wound on a coil 180. The coil 180 have shafts substantially parallel to the rollers 150 and the collecting unit 170, thus the substrate 120 can smoothly pass between the rollers 150.

In step S20 can include the steps of: (a) selecting a carbon nanotubes segment having a predetermined width from the carbon nanotube array 110 using a drawing tool; and (b) pulling the carbon nanotube segment at an even/uniform speed substantially along the first direction X such that the original carbon nanotube film 130 shown in FIG. 6 is formed. The drawing tool can be a tool with a certain width, such as an adhesive tape or a tweezer.

During the pulling process, as the initial carbon nanotube segment is drawn out, other carbon nanotube segments are also drawn out end-to-end due to the van der Waals attractive force between ends of adjacent segments. In general, the initially selected carbon nanotubes are drawn out from the carbon nanotube array by moving the drawing tool. The following carbon nanotubes adjacent to the initially selected carbon nanotubes are then drawn out by van der Waals attractive force between the following carbon nanotubes and the initially selected carbon nanotubes thereby forming the original carbon nanotube film 130 with carbon nanotubes joined end-to-end by van der Waals attractive force therebetween. This process of drawing ensures that a continuous, uniform free-standing original carbon nanotube film 130 having a predetermined width can be formed.

The width of the original carbon nanotube film 130 depends on a size of the carbon nanotube array. The length of the original carbon nanotube film 130 can be arbitrarily set as desired. When the carbon nanotube array 110 is grown on a 4-inch P-type silicon wafer, as in the present embodiment, the width of the original carbon nanotube film 130 ranges approximately from 0.01 centimeters to 10 centimeters, and the thickness of the original carbon nanotube film 130 ranges approximately from 0.5 nanometers to 100 microns. The width of the original carbon nanotube film 130 is wider than or equal to the widths of the substrate 120 and the rollers 150.

During the pulling process, the carbon nanotubes in the carbon nanotube array 110 are continuously drawn out to form the original carbon nanotube film 130, and therefore the size of the carbon nanotube array continuously decreases and the length of the original carbon nanotube film 130 continuously increases. After step S20, the original carbon nanotube film 130 is still in the pulling process, and one end of the original carbon nanotube film 130 in the length direction is clamped by the drawing tool, and the other end of the original carbon nanotube film 130 is connected to the carbon nanotube array 110.

The step S20 can include two or more original carbon nanotube films 130 simultaneously pulled from two or more carbon nanotube arrays 110 separately, all of which are still in the pulling process and the ends of the original carbon nanotube films 130 are connected to the carbon nanotube arrays 110 separately. In addition, the step S20 can include a step of forming a number of original carbon nanotube films 130 by drawing from the carbon nanotube array 110.

In step S30, one end of the original carbon nanotube film 130 overlaps with the substrate 120 along the length direction of the substrate 120, and the substrate 120 with the original carbon nanotube film 130 is passed between the pair of rollers 150 and connected to the collecting unit 170. The original carbon nanotube film 130 is adhered to the substrate 120. The original carbon nanotube film 130 between the carbon nanotube array 110 and the rollers 150 is suspended.

The original carbon nanotube film 130 has a large specific surface area and is adhesive. Thus, the original carbon nanotube film 130 can directly adhere onto the surface of the substrate 120. In addition, the surface of the substrate 120 can be covered by an adhesive layer 160, and the original carbon nanotube film 130 is laid on the adhesive layer 160 and adhered onto the substrate 120 by the adhesive layer 160. The adhesive layer 140 can be sprayed or coated on the substrate 120. In one embodiment, the step S30 further includes a step of spraying UV adhesive on the surface of the substrate 120 before passing the surface of the substrate 120 between the rollers 150. The adhesive layer 160 is not completely solidified before the substrate 120 is passed between the rollers 150.

The axes of the rollers 150 can be substantially parallel to the top surface of the carbon nanotube array 110, and thus, the original carbon nanotube film 130 drawn from the carbon nanotube array 110 can be continuously passed between the rollers 150 and fixed on the collecting unit 170.

The step S40 is mainly used to form spaced through holes 132 arranged in the first direction X in the original carbon nanotube film 130. The original carbon nanotube film 130 can be patterned using laser beams or electron beams to irradiate the original carbon nanotube film 130.

In one embodiment, the original carbon nanotube film 130 is patterned by laser beams, and the step S40 includes the following sub-steps. A laser is provided. An irradiating path of a laser beam emitted from the laser can be controlled by a computer. A shape of the original carbon nanotube film 130 having the though holes 132 are input into the computer, which is to control the irradiating path of the laser beam. The laser irradiates the original carbon nanotube film 130 to form the through holes 132. A power density of the laser beam ranges from about 10000 watts per square meter to about 100000 watts per square meter and a moving speed of the laser beam ranges from about 800 millimeters per second (mm/s) to about 1500 mm/s. In one embodiment, the power density is in a range from about 70000 watts per square meter to about 80000 watts per square meter, and the moving speed is in a range from about 1000 mm/s to about 1200 mm/s.

In step S40, a shape of each through hole 132 can be a circle, ellipse, triangle, quadrangle, or other shapes. The quadrangle shape can have at least one pair of substantially parallel sides, such as a parallelogram, trapezoid, rectangle, square, or rhombus. In one embodiment, the shape of each through hole 132 is rectangular. In another embodiment, the shape of the through hole 132 is a straight line, which can be considered as a rectangle with a narrow width. An effective diameter of the through hole 132 is larger than the effective diameter of the micropore in the original carbon nanotube film 130. In one embodiment, the effective diameter of the through hole 132 is larger than or equal to 0.1 millimeters. A space between adjacent through holes 132 is larger than the effective diameter of the micropore in the original carbon nanotube film 130. In one embodiment, the space between adjacent through holes 132 is larger than or equal to 0.1 millimeters. The shape and effective diameter of the through hole 132 and the space between adjacent through holes 132 can be selected as desired.

Figure 8:
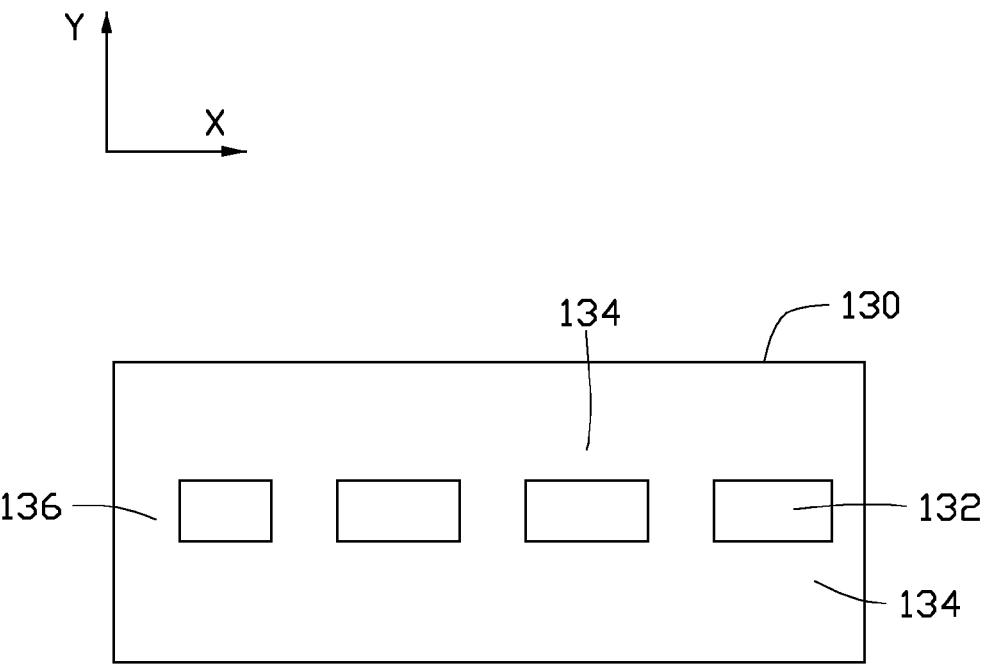
FIG. 8 is a schematic view of a patterned carbon nanotube film including a number of through holes substantially arranged in a row.

In step S40, the patterned carbon nanotube film can be divided into a number of connecting parts 136 and at least two extending parts by the through holes 134. The connecting parts 136 are located between adjacent through holes 132 in each row. The connecting parts 136 are separated from each other along the first direction X by the through holes 132. The at least two extending parts 136 extend substantially along the first direction X. The at least two extending parts 136 are connected with each other on a second direction Y by the connecting parts 136. The second direction Y is intercrossed with the first direction X. Therefore, the at least two extending parts 134 and the connecting parts 136 are an integrated structure. Specifically, structures of the patterned carbon nanotube films can be described as follow:

(1) Referring to FIG. 8, a number of through holes 132 are separately formed in an original carbon nanotube film 130. The through holes 132 are arranged into only one row in a first direction X. The first direction X is substantially parallel to the extending direction of the carbon nanotubes in the original carbon nanotube film 130. The original carbon nanotube film 130 can be divided into a number of connecting parts 136 and two extending parts 134 by the through holes 132. The connecting parts 136 are parts of the original carbon nanotube film 130 between adjacent through holes 132 in the same row. The two extending parts 134 are parts of the original carbon nanotube film 130 except the connecting parts 136.

The connecting parts 136 are separated from each other by the though holes 122. The connecting parts 136 and the though holes 122 in the same row are alternately arranged. The two extending parts 134 are located on two opposite sides of the connecting parts 136. The extending parts 134 are divided by the connecting parts 136 in a second direction Y crossed with the first direction X. In one embodiment, the second direction Y is substantially perpendicular to the first direction X. Each extending part 134 extends substantially along the first direction X.

Figure 9:
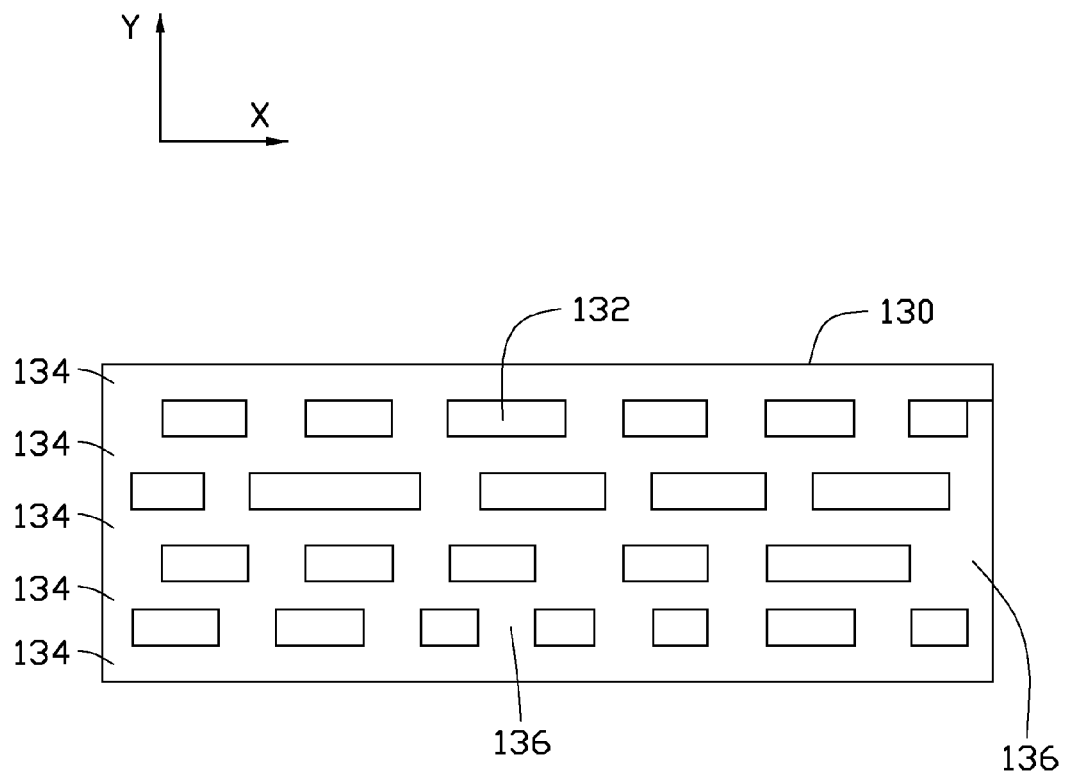
FIG. 9 is a schematic view of a patterned carbon nanotube film including a number of through holes substantially arranged in a number of rows.

(2) Referring to FIG. 9, a number of through holes 132 are arranged into a number of rows in the original carbon nanotube film 130. The through holes 132 in the same row are spaced from each other in the first direction X. The through holes 132 are interlaced with each other in the second direction Y. That is, the through holes 132 in the second direction Y are not arranged in a straight line. The through holes 132 in the second direction Y can also be arranged in columns, and the through holes 132 on the same column are spaced from each other. The through holes 132 can be arranged in an array.

The original carbon nanotube film 130 is divided into a number of connecting parts 136 and a number of extending parts 134 by the through holes 132. Every adjacent connecting parts 136 in the same row are separated by the through hole 132. A length of each connecting part 136 is equal to a space between adjacent through holes 132 in the same row in the first direction Y. Each extending part 134 is a connective structure in the first direction X. Each extending part 134 is sandwiched between adjacent connecting parts 126 in the second direction Y. A width of each extending part 134 in the second direction Y is substantially equal to a space between adjacent through holes 132 in the second direction Y. The extending parts 134 connect with adjacent connecting parts 136 arranged in the second direction Y. In one embodiment, an effective length of each through hole 132 in the first direction X is larger than a space between adjacent through holes 132 in the second direction Y.

The shapes of the through holes or the space between adjacent through holes arranged in the same row or in the same column can be different. In the patterned carbon nanotube film, the arrangement of the connecting parts 136 is similar to the arrangement of the through holes 132. There can be a few carbon nanotubes protruding around an edge of each through hole 132, which is a result of the manufacturing process of the carbon nanotube film.

Figure 10:
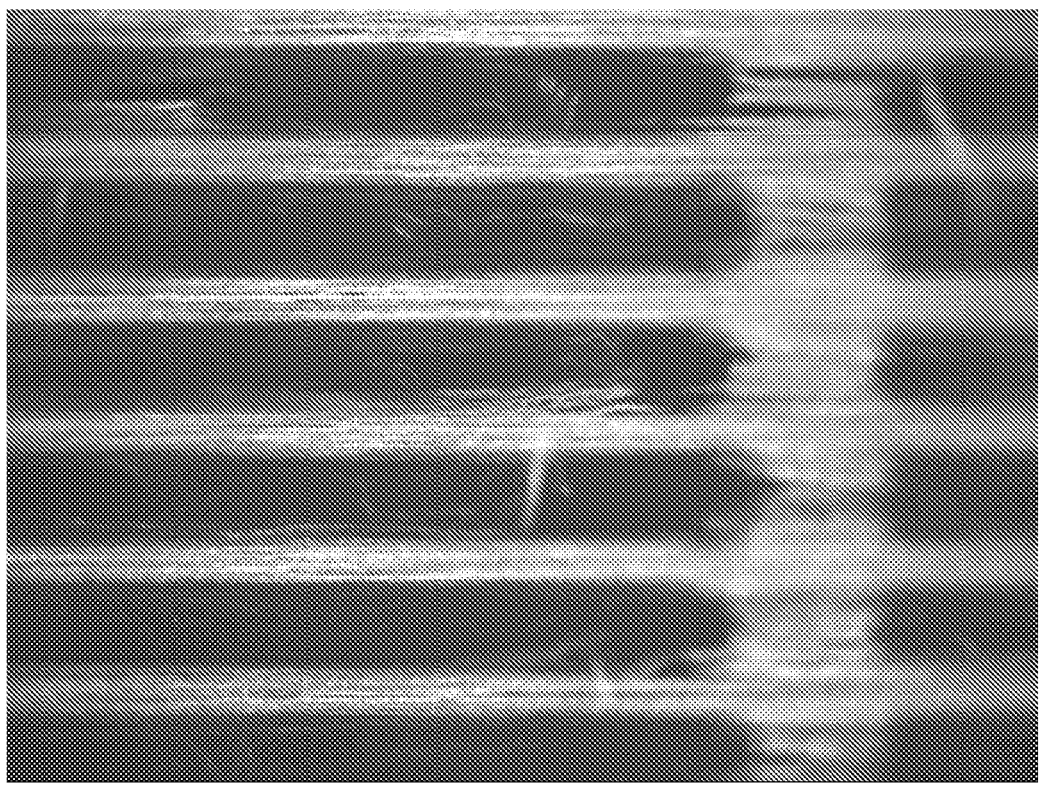
FIG. 10 is an optical microscope image of the patterned carbon nanotube film including through holes shown in FIG. 6.

In one embodiment, the original carbon nanotube film 130 is patterned by a laser with a power density of about 70000 watts per square millimeter, and a scanning speed of about 1100 millimeters per seconds. A number of rectangular through holes 132 are defined in the original carbon nanotube film 130. Referring to FIGS. 6 and 10, the patterned carbon nanotube film is divided into a number connecting parts 136 and a number of extending parts 134 by the through holes 132. The connecting parts 136 are arranged in an array, which is similar to the arrangement of the through holes 132. The spaces between adjacent through holes 132 in the first direction X and the second direction Y are about 1 millimeter. The length of the through hole 132 in the first direction X is about 3 millimeters. The width of the through hole 132 in the second direction Y is about 1 millimeter. The width of the extending part 134 in the second direction Y is equal to the spaces between adjacent through holes 132 in the second direction Y.

In step S50, the patterned carbon nanotube film is suspended. The step S50 can include dropping or spraying the solvent 138 on the suspended patterned carbon nanotube film, and further shrinking the patterned carbon nanotube film into the carbon nanotube film 140. Because the carbon nanotubes in each extending part 134 of the patterned carbon nanotube film are substantially joined end-to-end and substantially oriented along the first direction X, and each extending part 134 is a consecutive structure in the first direction X, the extending parts 134 are shrunk into the carbon nanotube linear units 142 of the carbon nanotube film 140 under interfacial tension. During the treating process with the solvent 138, each extending part 134 is substantially shrunk toward its center in the second direction Y and formed into the carbon nanotube linear unit 142, a space between adjacent extending parts 134 will be increased. Therefore, the carbon nanotube linear units 142 are spaced from each other in the carbon nanotube film 140. A space between adjacent carbon nanotube linear units 142 in the carbon nanotube film 140 is larger than the effective diameter of the through holes 132 connected with the extending part 134 or larger than the effective diameter of the through holes 132 defined by the original carbon nanotube film 130 in the second direction Y. Simultaneously, each connecting part 136 will be drawn under the shrinking of the adjacent extending parts 134. The connecting part 136 is formed into the carbon nanotube group 144 in the carbon nanotube film 140. Therefore, the carbon nanotube film 140 is formed.

An interfacial tension is generated between the patterned carbon nanotube film and the solvent 138, and the interfacial tension varies depending on the volatility of the solvent. Pulling forces applied to the connecting parts 136 are produced by the shrinking of the extending parts 134. The pulling forces vary depending on the interfacial tension. The pulling forces can affect the arrangement of the carbon nanotubes in the connecting parts 136, and further affect the structures of the carbon nanotube groups 144 in the carbon nanotube film 140.

If the solvent 138 is an organic solvent with a high volatility, such as alcohol, methanol, acetone, dichloroethane, or chloroform, the interfacial tension generated between the patterned carbon nanotube film and the solvent is strong. During the process of shrinking the extending parts 134, pulling forces are produced. The pulling forces applied to the connecting parts 136 adjacent to the extending parts 134 are strong. The carbon nanotubes oriented in the first direction X in the connecting parts 136 will be formed into the second carbon nanotubes extending substantially along a direction intercrossed with the first direction X. Simultaneously, under the interfacial tension, the carbon nanotubes in each connecting part 136 will shrink and each connecting part 136 will be formed into the carbon nanotube group 144 with a netlike structure. In one embodiment, a first angle defined by the second carbon nanotubes and the first direction X is greater than or equal to 45 degrees, and less than or equal to 90 degrees.

If the solvent 138 is water or a mixture of water and the organic solvent, the interfacial tension between the patterned carbon nanotube film and the solvent is relatively weak. The pulling forces generated by the shrinking of the extending parts are weak, thus the pulling forces are weakly applied to the connecting parts 136. The arrangements of the carbon nanotubes in the connecting parts 136 will slightly change by the weak pulling forces. A second angle defined by the second carbon nanotubes in the carbon nanotube groups 144 with the first direction X is less than or equal to 30 degrees. In one embodiment, the second angle is less than or equal to 15 degrees. In one embodiment, the solvent 138 is water, and during the process of forming the carbon nanotube linear units 142, the arrangements of carbon nanotubes in the connecting parts 136 do not substantially change. Therefore, the second carbon nanotubes in the carbon nanotube groups 144 are substantially parallel to the carbon nanotube linear units 142 and the first direction X.

In one embodiment, the step S50 is performed by the following steps. A drop bottle 137 is placed above the patterned carbon nanotube film 130. Alcohol solvent 138 from the drop bottle 137 is dropped onto the patterned carbon nanotube film 130. Under the interfacial tension produced between the extending part 134 and the alcohol solvent 138, each extending part 134 is shrunk toward its center to form the carbon nanotube linear unit 142. Simultaneously, the connecting parts 136 are formed into the carbon nanotube groups 144, and the carbon nanotube groups 144 are connected with the carbon nanotube linear units 142 in the second direction Y, and separated from each other in the first direction X. Thus, the carbon nanotube film 140 is formed.

The effective diameters of the carbon nanotube linear units 142 can be selected by the spaces between adjacent through holes 132 in the second direction Y and the shapes of the through holes 132. Spaces between adjacent carbon nanotube linear units 142 can be controlled by the spaces between adjacent through holes 132 in the second direction Y and the widths of through holes 132 in the second direction Y. In one embodiment, the shapes of the through holes 132 are rectangular, the widths of the through holes 132 in the second direction Y are substantially equal, and the spaces between adjacent though holes 132 in the same rows are substantially equal. Therefore, the shapes and the effective diameters of the carbon nanotube linear units 142 are substantially equal. Further, if the lengths of the through holes 132 along the first directions X are substantially equal, the carbon nanotube groups 144 will be substantially arranged in the second direction Y, and the shapes of the carbon nanotube groups 144 are substantially the same. In conclusion, both the spaces between adjacent carbon nanotube linear units 142 and the effective diameters of the carbon nanotube linear units 142, can be effectively and easily adjusted according to the method for making the carbon nanotube film provided by the present disclosure. The resistance of the carbon nanotube film, especially the electrically anisotropy of the carbon nanotube film, can be changed by the number of the through holes 132 in the patterned carbon nanotube film. That is, the step S40 can affect the resistance of the carbon nanotube film.

If two or more original carbon nanotube films 130 are drawn from the two or more carbon nanotube arrays 110, the top surfaces of the carbon nanotube arrays 110 can be substantially parallel to each other and substantially parallel to the rollers 150. The two or more original carbon nanotube films 130 can be stacked with each other or be substantially coplanar on the substrate 120, patterned and treated with solvent 138 to form the carbon nanotube layer 140 including a number of the carbon nanotube films 130, and then passing the carbon nanotube layer 140 between the rollers 150.

In step S60, the rollers 150 and the collecting unit 170 are operated, the pair of rollers 150 are rotated along opposite directions, and at the same time the collecting unit 170 is rotated. The carbon nanotube layer 140 and the substrate 120 are pulled and passed between the rollers 150 under the rotation of the collecting unit 170. Simultaneously, the rollers 150 apply pressure on the carbon nanotube layer 140 and the substrate 120 passed therebetween, and then the carbon nanotube layer 140 is fixed on the substrate 120. As such, the conductive element 100 is formed. In one embodiment, the rotating speeds of the rollers 150 are substantially the same as the rotating speed of the collecting unit 170.

Before the carbon nanotube layer 140 is formed by rotation of the collecting unit 170, the substrate 120 brings the original carbon nanotube film 130 to move, the original carbon nanotube film 130 between the carbon nanotube array 110 and the rollers 150 is patterned and treated with solvent 138 in that order, and then the carbon nanotube layer 140 is formed. As the collecting unit 170 is rotating and the rollers 150 are rotating, both the carbon nanotube layer 140 and the substrate 120 are passed between the rollers 150. The carbon nanotube layer 140 is fixed on the substrate 120 by the pressure applied by the rollers 150 to form the conductive element 100. Next, the conductive element 100 brings the carbon nanotube layer 140 to move as the collecting unit 170 rotates. The original carbon nanotube film 130 is continuously drawn from the carbon nanotube array 110, continuously patterned, and treated with the solvent 318 in that order. Therefore, the carbon nanotube layer 140 is continuously formed. At the same time, the substrate 120 is constantly pulled out from the coil 180.

In one embodiment, a number of carbon nanotube arrays 110 are provided. A number of original carbon nanotube films 130 are continuously drawn from the carbon nanotube arrays 110 as the collecting unit 170 rotates.

The rollers 150 can be heated to an elevated temperature, thereby combining the carbon nanotube layer 140 firmly with the substrate 120. When the adhesive layer 160 is coated on the substrate 120, the adhesive layer 160 can be melted when passing between the rollers 150.

In one embodiment, in step S30, the adhesive layer 160 is made of UV adhesive. The step S70 further includes steps of irradiating the adhesive layer 160 using UV and solidifying the adhesive layer 160. The original carbon nanotube film 130 or the carbon nanotube layer 140 is firmly adhered to the substrate 120.

Figure 11:
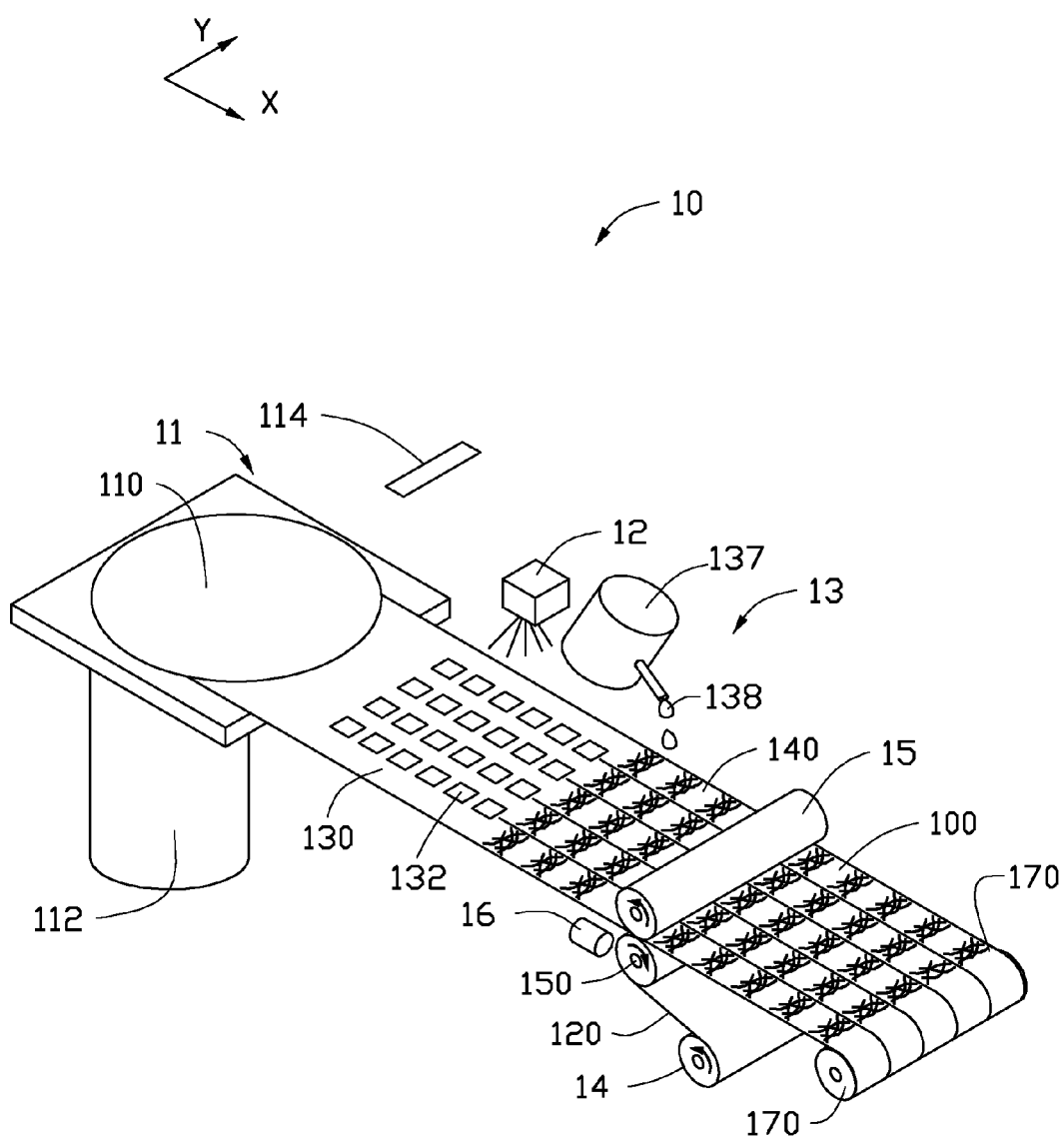
FIG. 11 is a schematic view of one embodiment of an apparatus for making a carbon nanotube film.
Figure 12:
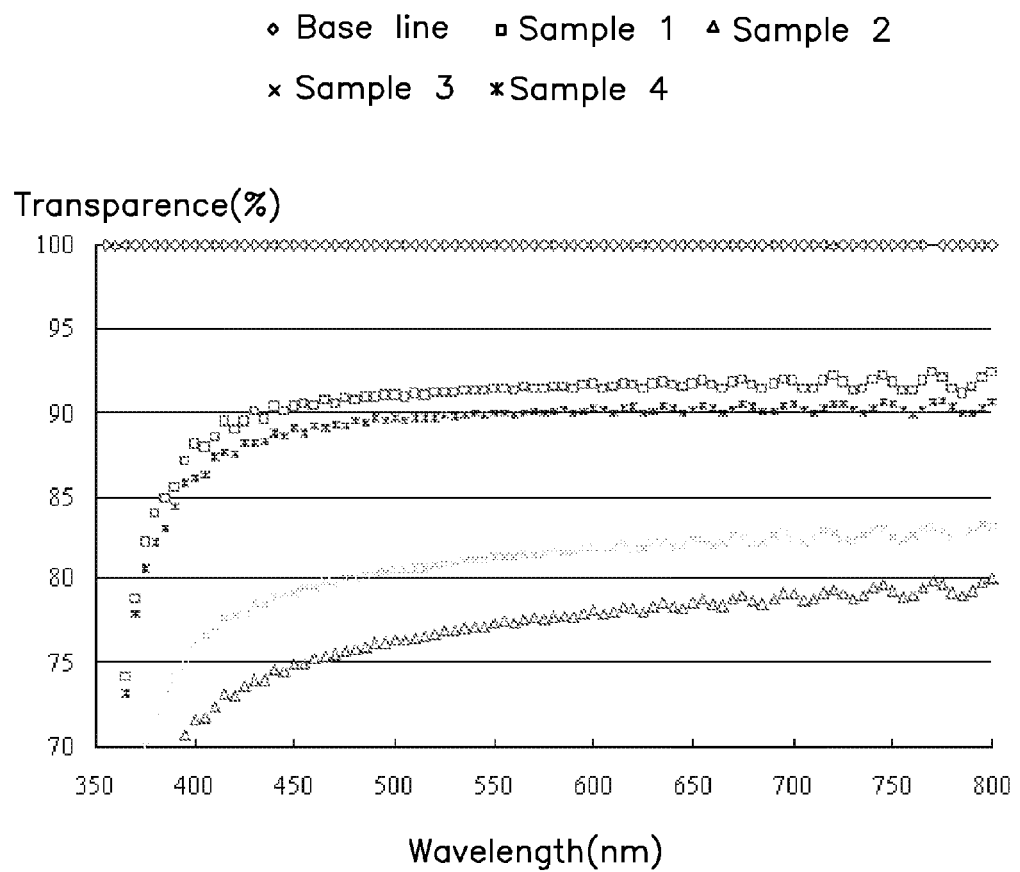
FIG. 12 shows a transparence chart of different kinds of conductive films including carbon nanotubes.

Referring to FIG. 11, one embodiment of an apparatus 10 for making the conductive element 100 using the above method is provided. The apparatus 10 includes an original carbon nanotube film supply unit 11, a patterned unit 12, a solvent treating unit 13, a substrate supply unit 14, a pressing unit 15, and a collecting unit 170.

The original carbon nanotube film supply unit 11 is configured to continuously supply the original carbon nanotube film 130 for the patterned unit 12 along the first direction X. In one embodiment, the original carbon nanotube film supply unit 11 includes the carbon nanotube array 110, a supply stage 112 configured to fix the carbon nanotube array 110, and a drawing tool 114 configured to drawing the original carbon nanotube film 130 from the carbon nanotube array 110 along the first direction X.

The patterned unit 12 is configured to pattern the original carbon nanotube film 130 such that at least one row of through holes 132 defined in the original carbon nanotube film 130 and arranged in the first direction X is formed. The at least one row of through holes 132 includes at least two through holes 132. The patterned unit 12 can be a laser or an electronic emission device. In one embodiment, the patterned unit 12 is the laser.

The solvent treating unit 13 is configured to treat the patterned carbon nanotube film with the solvent after the original carbon nanotube film is patterned by the patterned unit 12, and the patterned carbon nanotube film is soaked by the solvent and shrunk into the carbon nanotube layer 140. In one embodiment, the solvent treating unit 13 includes the solvent 138, and a drop bottle 137 receiving the solvent 138. The drop bottle 137 defines an opening for leaking the solvent 138. The container for receiving the solvent 138 is not limited to the drop bottle 137 such as a sprayer.

The substrate supply unit 14 is configured to continuously provide the substrate 120. In one embodiment, the substrate supply unit 14 includes a coil 180 and the substrate 120 wound around the coil 180.

The pressing unit 15 is configured to apply a pressure on the carbon nanotube layer 140 overlapped with the substrate 120 and form the conductive element 100. In one embodiment, the pressing unit 15 includes a pair of rollers 150 capable of rotating along opposite directions. The carbon nanotube layer 140 overlapped with the substrate 120 is passed between the rollers 150 and fixed tightly by the pressure generated by the rollers 150.

The collecting unit 170 is configured to collect the conductive element 100 and bring the substrate 120 and carbon nanotube layer 140 fixed thereon to move away from the original carbon nanotube film supply unit 11. The original carbon nanotube film 130 is continuously drawn from the carbon nanotube array 110 as the carbon nanotube layer 140 is moving. Therefore, the conductive element 100 can be continuously produced. In one embodiment, the collecting unit 170 includes a collecting shaft capable of moving the conductive element 100 along the first direction X and winding the conductive element 100 around the collecting shaft 172.

The apparatus 10 can further include an adhesive supply unit 16 configured to form the adhesive layer on the substrate 120 before the substrate 120 is applied in the pressing unit 15. In one embodiment, the adhesive supply unit 16 is an adhesive sprayer.

The method and the apparatus 10 continuously prepare the conductive element 100 in a mass production setup. The carbon nanotube array 110 and the substrate 120 can be easily supplied when needed. In use, the conductive element 100 can be cut to desired lengths and shapes. The conductive element 100 is transparent, and can be a transparent conductive film. The conductive element 100 has better flexural endurance than a similar structure having an ITO layer one the same substrate 120.

The conductive element 100 is made by the roll-to-roll process. To ensure the conductive element 100 is produced by the roll-to-roll process using the apparatus 10, the patterned carbon nanotube film and the carbon nanotube layer 140 should be strong enough to not break during the pulling of the collecting unit 170. The strengths of the patterned carbon nanotube film and the carbon nanotube layer 140 are related to the parameters of the through holes defined in the patterned carbon nanotube film.

Referring to table 1, the carbon nanotube layer 140 is made from a single layer original carbon nanotube film 130. The original carbon nanotube film 130 is patterned using a laser to form the patterned carbon nanotube film including a number of rectangular through holes 132 arranged in an array. A scanning frequency of the laser is about 20 kHz. The length of each through hole 132 in the first direction X is marked as parameter A, the width of each through hole 132 in the second direction Y is marked as parameter B, the space between adjacent through holes 132 in the first direction X is marked as parameter C, and the space between adjacent through holes 132 in the second direction Y is marked as parameter D. In one embodiment, the parameter A is smaller than the parameter D. If compared with the parameter A, the parameter B is relatively small, such as the parameter B is considered as 0. In the following table 1, a scanning speed of the laser applied to samples 1-10 is about 500 millimeters per seconds, and the single line scanning speed of the laser applied to samples 11-13 is about 5 millimeters per seconds.

TABLE 1 the through holes affect the roll-to-roll process for making the carbon nanotube layer

| sample | parameter A (millimeter) | parameter B (millimeter) | parameter C (millimeter) | parameter D (millimeter) | possibility of the roll-to-roll process patterned carbon nanotube film | carbon nanotube layer 140 |
|---|---|---|---|---|---|---|
| 1 | 3 | 0.5 | 1 | 1 | yes | yes |
| 2 | 3 | 0.6 | 0.9 | 0.9 | yes | yes |
| 3 | 3 | 0.7 | 0.8 | 0.8 | yes | yes |
| 4 | 3 | 0.6 | 1 | 0.9 | yes | yes |
| 5 | 3 | 0.7 | 1 | 0.8 | reluctant yes | yes |
| 6 | 3 | 0.8 | 1 | 0.7 | no | yes |
| 7 | 3 | 0.9 | 1 | 0.8 | reluctant yes | yes |
| 8 | 3 | 0.9 | 1 | 0.6 | no | yes |
| 9 | 3 | 1 | 1 | 0.5 | no | yes |
| 10 | 3 | 0 | 0.15 | 0.3 | yes | yes |
| 11 | 3 | 0 | 0.1 | 0.3 | yes | yes |
| 12 | 3 | 0 | 0.15 | 0.2 | yes | yes |
| 13 | 3 | 0 | 0.3 | 0.2 | yes | yes |

The single layer of the carbon nanotube film in the conductive element 100 can be made by the roll-to-roll process, which is shown in table 1. In the samples 5 and 7, the parameters B and D are substantially equal, the patterned carbon nanotube films are nearly applied the roll-to-roll processes. If the parameters D are greater than the parameters B, the patterned carbon nanotube films can be applied the roll-to-roll processes. Therefore, during the roll-to-roll process of making the conductive element 100, the parameters D are greater than or equal to the parameters B. In one embodiment, the parameters D is greater than the parameters B.

The tension of the carbon nanotube layer 140 is strong. In one embodiment, the carbon nanotube layer 140 is made from a single patterned carbon nanotube film with the width of about 15 millimeters. The patterned carbon nanotube film defines the through holes. The parameters A, B, C, and D of the through holes are respectively about 3 millimeters, about 0.35 millimeters, about 0.8 millimeters, and about 0.35 millimeters. A tension of the carbon nanotube film is about 105 milli-Newtons. Tension means that the carbon nanotube layer can undergo the maximal pulling tension along the first direction.

The conductive element 100 is transparent and electrically conductive. The transparences under various wavelengths of the following samples 1-4 are shown in the table 2. The resistances of samples 1-4 in the first direction X and the second direction Y are shown in table 2. Samples 1-4 are made into a 3 millimeters×3 millimeters shape. In table 2, sample "1" represents a PET sheet, sample "2" represents the single original carbon nanotube film 130 fixed on the substrate 120 by UV adhesive, sample "3" represents a patterned carbon nanotube film fixed on the substrate 120 by UV adhesive, sample "4" represents the conductive element 100 including the carbon nanotube layer 140 made by treating the patterned carbon nanotube film in the sample 3 with solvent, "X" represents the first direction X, which is the carbon nanotubes in the samples extending direction, and "Y" represents the second direction Y. In the embodiment, the second direction Y is substantially perpendicular to the first direction X. Samples 2-4 are adhered to the PET sheets by a mixture of UV adhesive and butyl acetate with 1:1 by volume. The transparence of samples 1-4 are measured in suspended state under different wavelengths.

TABLE 2

| sample | Resistance/ KΩ | | transparence under different wavelengths/% | | | | | | | |
|---|---|---|---|---|---|---|---|---|---|---|
| | X | Y | 370 nm | 450 nm | 500 nm | 550 nm | 600 nm | 650 nm | 700 nm | 750 nm |
| 1 | ∞ | ∞ | 78.80 | 90.40 | 91.10 | 91.40 | 91.7 | 91.80 | 91.90 | 91.80 |
| 2 | 1.245 | 108.0 | 63.33 | 74.88 | 76.36 | 77.29 | 78.11 | 78.58 | 79.04 | 79.3 |
| 3 | 2.00 | 160.5 | 67.17 | 79.13 | 80.48 | 81.32 | 81.84 | 82.35 | 82.35 | 82.48 |
| 4 | 3.23 | 163.3 | 77.88 | 89.08 | 89.72 | 89.95 | 90.27 | 90.16 | 90.55 | 90.59 |

From table 2, the resistance of the carbon nanotube layer 140 in the conductive element 100 in every direction is larger than the resistances of the original carbon nanotube film 130 and the patterned carbon nanotube film. But the carbon nanotube layer 140 is still an anisotropic and electrically conductive film, and the resistance of the single layer carbon nanotube film in the carbon nanotube layer 140 in the second direction is over 50 times greater than that in the first direction X. The transparence of the conductive element 100 is excellent in samples 2 and 3 under each wavelength. Further, the transparency of the sample 4 is close to the transparency of the sample 1, that is, the transparency of the conductive element 100 is close to the transparency of the substrate 120. Therefore, the transparence of the carbon nanotube layer 140 in the conductive element 100 is high.

Figure 13:
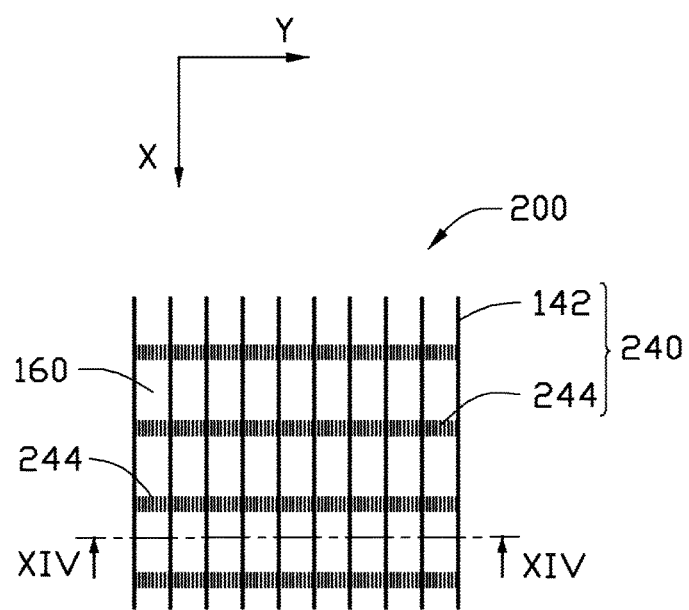
FIG. 13 is a schematic view of another embodiment of a carbon nanotube film.
Figure 14:
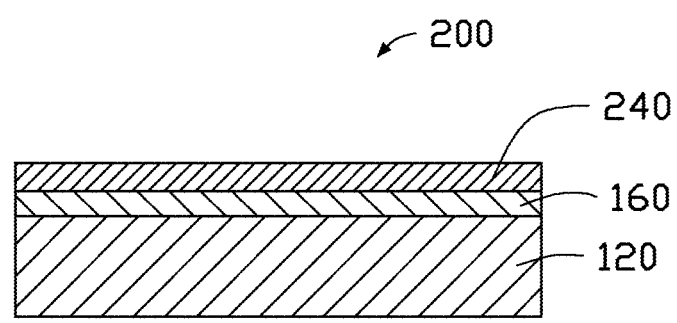
FIG. 14 is a sectional view of the conductive element shown in FIG. 13 along a broken line XIV-XIV.
Figure 15:
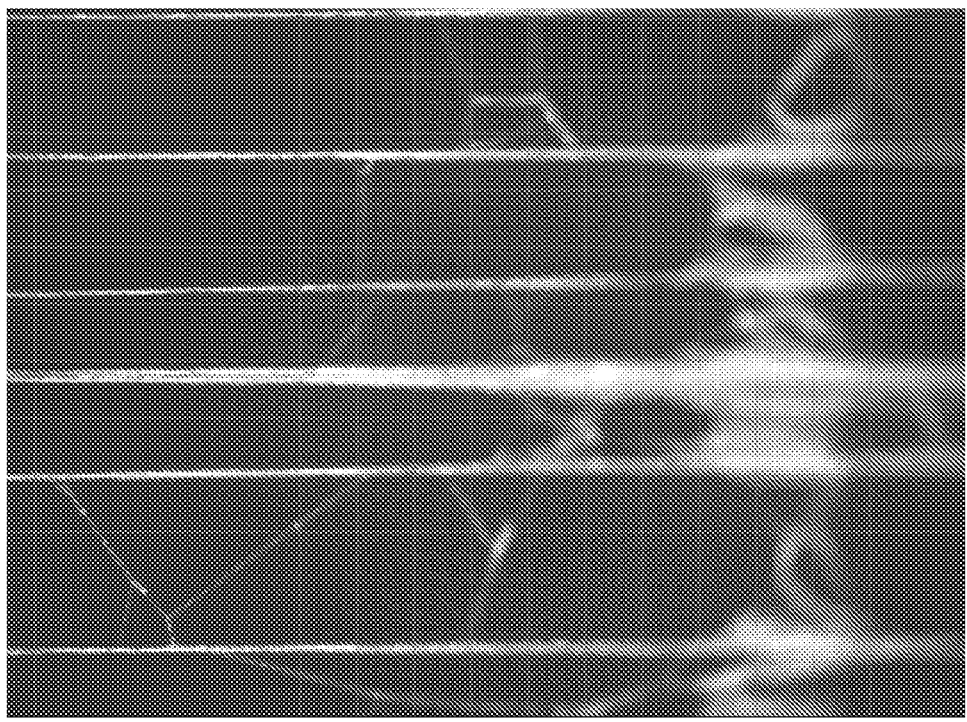
FIG. 15 is an optical microscope image of the carbon nanotube film shown in FIG. 13.

Referring to FIGS. 13 and 14, one embodiment of a conductive element 200 is provided. The conductive element 200 includes the substrate 120, the adhesive layer 160, and the carbon nanotube layer 240 adhered to the substrate 120 by the adhesive layer 160. The carbon nanotube layer 240 can be shown in FIG. 15. Specifically, the carbon nanotube layer 240 includes a number of the carbon nanotube linear units 142 and a number of the carbon nanotube groups 244 arranged in an array. The structure of the carbon nanotube layer 240 is similar to that of the carbon nanotube layer 140, except that the carbon nanotube groups 244 includes a number of carbon nanotubes 242 extending substantially along the first direction X. The carbon nanotube linear units 142 extend substantially along the first direction X. A distance between two adjacent carbon nanotube groups 244, along an axial direction of the plurality of carbon nanotube linear units 142, is substantially equal to each other. A length of the plurality of carbon nanotubes in each carbon nanotube group 244 is substantially equal to each other and less than a length of the plurality of carbon nanotube linear units 142.

A method for making the conductive element 200 is similar to the method for making the conductive element 100. The method for making the carbon nanotube layer 240 is different from the method for making the carbon nanotube layer 140. Specifically, the carbon nanotube layer 240 is made by treating the patterned carbon nanotube film with water.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. An electrically conductive element comprising a substrate and a carbon nanotube film located on the substrate, the carbon nanotube film comprising:
    a plurality of carbon nanotube linear units spaced from each other and extending substantially along a first direction, and each of the plurality of carbon nanotube linear units comprising a plurality of first carbon nanotubes oriented substantially along the first direction; and
    a plurality of carbon nanotube groups combined with the plurality of carbon nanotube linear units by van der Waals force in a second direction intersected with the first direction, wherein the plurality of carbon nanotube groups between adjacent carbon nanotube linear units are spaced from each other in the first direction; there is an aperture between adjacent two of the plurality of carbon nanotube groups in the first direction, and the aperture is empty; and the plurality of carbon nanotube groups are arranged as a plurality of columns spaced from each other, each of the plurality of carbon nanotube group comprises a plurality of second carbon nanotubes, and a first length direction of the plurality of second carbon nanotubes is parallel to a second length direction of the plurality of carbon nanotube linear units.

2. The electrically conductive element of claim 1, wherein the plurality of carbon nanotube groups are interlacedly arranged in the second direction.

3. The electrically conductive element of claim 1, wherein the plurality of carbon nanotube groups are arranged to form the plurality of columns in the second direction.

4. The electrically conductive element of claim 3, wherein the plurality of carbon nanotube groups forms a plurality of second conductive paths in the second direction.

5. The electrically conductive element of claim 1, wherein the plurality of first carbon nanotubes is joined end-to-end by van der Waals force along the first direction.

6. The electrically conductive element of claim 1, wherein an effective diameter of each of the plurality of carbon nanotube linear units is greater than or equal to 0.1 micrometers, and less than or equal to 100 micrometers.

7. An electrically conductive element comprising:
a substrate; and
a carbon nanotube film located on the substrate and comprising a plurality of carbon nanotubes defining a plurality of apertures, and a surface area ratio of the plurality of carbon nanotubes to the plurality of apertures is less than or equal to 1:19;
wherein the carbon nanotube film further comprises a plurality of carbon nanotube linear units and a plurality of carbon nanotube groups alternated with the plurality of carbon nanotube linear units on a second direction, each of the plurality of carbon nanotube linear units comprises a plurality of first carbon nanotubes substantially joined end to end along a first direction, that intersects with the second direction; and each of the plurality of carbon nanotube groups comprises a plurality of second carbon nanotubes, a first length direction of the plurality of second carbon nanotubes is parallel to a second length direction of the plurality of carbon nanotube linear units, there is an aperture between adjacent two of the plurality of carbon nanotube groups in the first direction, and the aperture is empty.

8. The electrically conductive element of claim 7, wherein the surface area ratio of the plurality of carbon nanotubes to the plurality of apertures is less than or equal to 1:49.

9. The electrically conductive element of claim 7, wherein the plurality of carbon nanotube linear units are combined with the plurality of carbon nanotube groups by van der Waals force, and the carbon nanotube film is a free-standing structure.

10. The electrically conductive element of claim 9, wherein the plurality of carbon nanotube linear units are spaced from each other, and the plurality of carbon nanotube groups between adjacent carbon nanotube linear units are separated from each other.

11. The electrically conductive element of claim 10, wherein the plurality of carbon linear units are separated from each other in the second direction and extend substantially along the first direction, and the plurality of carbon linear units form a plurality of conductive paths in the first direction.

12. The electrically conductive element of claim 7, wherein the plurality of apertures are arranged in an array, and the plurality of carbon nanotube linear units and the plurality of carbon nanotube groups are arranged in a plurality of columns and rows.

13. The electrically conductive element of claim 7, further comprising an adhesive layer fixing the carbon nanotube film on a surface of the substrate, and exposing through the plurality of apertures.

14. The electrically conductive element of claim 1, wherein a distance between two adjacent carbon nanotube groups, along an axial direction of the plurality of carbon nanotube linear units, is substantially equal to each other.

15. The electrically conductive element of claim 1, wherein a length of the plurality of second carbon nanotubes is substantially equal to each other and less than a length of the plurality of carbon nanotube linear units.

16. The electrically conductive element of claim 1, wherein spaces between adjacent carbon nanotube groups in the first direction are greater than or equal to 1 millimeter.

17. An electrically conductive element comprising a substrate and a carbon nanotube film located on the substrate, the carbon nanotube film consisting of:
a plurality of carbon nanotube linear units spaced from each other and extending substantially along a first direction, wherein each of the plurality of carbon nanotube linear units consists of a plurality of first carbon nanotubes oriented substantially along the first direction; and
a plurality of carbon nanotube groups in a second direction intersected with the first direction, wherein the plurality of carbon nanotube groups between adjacent carbon nanotube linear units are spaced from each other in the first direction, the plurality of carbon nanotube groups are arranged as a plurality of columns spaced from each other in the second direction, each of the plurality of carbon nanotube group consists of a plurality of second carbon nanotubes intersected with each other to form a netlike structure, and the plurality of carbon nanotube groups is combined with the plurality of carbon nanotube linear units by van der Waals force to form an integrated film.

18. The electrically conductive element of claim 1, wherein the carbon nanotube film consists of the plurality of carbon nanotube linear units and the plurality of carbon nanotube groups.

19. The electrically conductive element of claim 1, wherein the plurality of carbon nanotube linear units and the plurality of carbon nanotube groups are in the same plane.

20. The electrically conductive element of claim 17, wherein the plurality of carbon nanotube linear units and the plurality of carbon nanotube groups are in the same plane.

* * * * *